United States Patent [19]
McNeilly et al.

[11] Patent Number: 5,485,220
[45] Date of Patent: Jan. 16, 1996

[54] SYNC STRIPPER CIRCUIT

[75] Inventors: Peter J. McNeilly; Martin E. Trzcinski, both of Rochester, N.Y.

[73] Assignee: Eastman Kodak Company, Rochester, N.Y.

[21] Appl. No.: 979,999

[22] Filed: Nov. 23, 1992

[51] Int. Cl.$^6$ .................................................. H04N 5/08
[52] U.S. Cl. ........................ 348/525; 348/526; 348/529; 348/530
[58] Field of Search ..................... 358/148, 149, 358/150, 151, 152, 153, 154, 158, 159, 140, 409, 410, 411, 141; 348/525, 526, 529, 530, 531, 555, 558; H04N 5/08, 5/04

[56] References Cited

U.S. PATENT DOCUMENTS

| | | |
|---|---|---|
| 4,064,541 | 12/1977 | Schneider et al. . |
| 4,185,299 | 1/1980 | Harford . |
| 4,379,309 | 4/1983 | Berke et al. . |
| 4,550,342 | 10/1985 | Buchanan et al. . |
| 4,635,115 | 1/1987 | Kamiya . |
| 4,675,734 | 6/1987 | Widom ..................................... 358/154 |
| 4,683,495 | 7/1987 | Brock . |
| 4,792,853 | 12/1988 | Yamagishi et al. ..................... 348/526 |
| 4,827,341 | 5/1989 | Akimoto et al. . |
| 4,860,098 | 8/1989 | Murphy . |
| 4,872,054 | 10/1989 | Gray et al. .............................. 358/148 |
| 4,897,723 | 1/1990 | Arai . |
| 4,954,893 | 9/1990 | Urakami .................................. 358/148 |
| 5,012,339 | 4/1991 | Kurata et al. . |
| 5,025,496 | 6/1991 | Canfield . |
| 5,151,786 | 9/1992 | Kawamoto .............................. 348/525 |

*Primary Examiner*—James J. Groody
*Assistant Examiner*—Michael H. Lee
*Attorney, Agent, or Firm*—William F. Noval

[57] ABSTRACT

A sync stripper circuit receives from a medical imaging modality a composite video signal with a horizontal sync frequency within one of first, second, third or fourth frequency ranges. The sync stripper circuit includes a circuit for stripping the composite sync signal from the received signal; horizontal sync detection circuit for detecting the horizontal sync signal from the stripped composite sync signal; a vertical sync detection circuit for detecting the vertical sync signal; an F1/F2 field detection circuit for detecting the F1/F2 field from the stripped composite sync signal; and a control circuit for controlling the horizontal sync detection circuit, the vertical sync detection circuit and the F1/F2 field detection circuit to operate in the selected one of said first, second, third or fourth frequency ranges of the received composite video signal. A serrating signal circuit inserts a horizontal signal into the vertical sync signal if serrating signals are absent therein.

5 Claims, 7 Drawing Sheets

SYNC STRIPPER CIRCUIT

FIELD OF THE INVENTION

This invention relates in general to medical imaging systems, and relates more particularly to a sync stripper circuit used in an interface between a medical imaging modality and a radiographic printer.

BACKGROUND OF THE INVENTION

In traditional film/screen medical diagnostic imaging, an anatomical part of a patient is positioned between an x-ray source and an unexposed film/screen, an x-ray exposure is taken of the anatomical part to produce a latent film image, and the film is developed. The developed x-ray film is then viewed on a light box by a diagnostician (radiologist/physician). More recently, medical diagnostic imaging modalities, such as CT and MRI scanners, have produced x-ray images which are viewed on a video monitor. Frequently, a film image of a video image is made by photographing the video monitor. The film image can also be produced by a laser printer (such as the KODAK EKTASCAN LASER PRINTER sold by the Eastman Kodak Company, Rochester, N.Y.).

When using a laser printer to produce a permanent x-ray film image, problems arise from the different video formats used by different medical imaging modalities. Typically, the analog video signal produced by the modality is converted to a digital image signal which is used to drive the laser printer.

In order to effect proper conversion of the analog signal to a digital signal, the timing signals of the analog signal must be regenerated. These timing signals include composite sync, horizontal sync, vertical sync, and F1/F2 signals for identifying the odd and even fields of an interlaced video signal. Where the incoming analog video signal format has no serrating pulses during the vertical sync interval, serrating pulses must be added in order to prevent loss of lock of a regenerated pixel clock.

A known sync stripper device (the LM1881 SYNC STRIPPER supplied by National Semiconductor Company) generates basic timing signals for standard NTSC video, but lacks the capability to support non-standard video formatted modalities encountered in medical imaging applications. Moreover, the thermal performance of the LM1881 device is totally unacceptable, since at elevated temperatures both horizontal and vertical sync signals drift severely, causing artifacts to appear on video films (i.e., line shifts and swapped interlacing fields).

The following patents are illustrative of various techniques for effecting sync stripping, odd and even field determination and plural synchronization mode sync processing which are not entirely suitable in multi-modality medical image processing:

U.S. Pat. No. 4,827,341, issued May 2, 1989, inventors Akimoto et al.

U.S. Pat. No. 4,450,342, issued Oct. 29, 1985, inventors Buchanan et al.

U.S. Pat. No. 4,064,541, issued Dec. 20, 1977, inventors Schneider et al.

U.S. Pat. No. 4,379,309, issued Apr. 5, 1983, inventors Berke et al.

U.S. Pat. No. 4,185,299, issued Jan. 22, 1980, inventor Harford.

U.S. Pat. No. 4,897,723, issued Jan. 30, 1990, inventor Arai.

U.S. Pat. No. 4,860,098, Issued Aug. 22, 1989, inventor Murphy.

U.S. Pat. No. 4,635,115, issued Jan. 6, 1987, inventor Kamiya.

U.S. Pat. No. 5,025,496, issued Jun. 18, 1991, inventor Canfield.

U.S. Pat. No. 5,012,339, issued Apr. 30, 1991, inventors Kurata et al.

U.S. Pat. No. 4,683,495, issued Jul. 28, 1987, inventor Brock.

There is thus a problem in medical imaging systems to provide a sync stripper circuit which has stable electrical and thermal performance, which is capable of supporting non-standard video formats, which generates composite sync, horizontal sync, vertical sync, F1/F2 field determination and which compensates the absence of serrating pulses during the vertical sync interval.

SUMMARY OF THE INVENTION

According to the present invention, there is provided a new and improved sync stripper circuit for use in medical imaging applications, which provides a solution to the problems of known sync stripper circuits. According to the sync stripper circuit of the present invention, both the electrical and thermal deficiencies of a known sync stripper circuit are eliminated, and extended video formats that include both NTSC and non-standard NTSC formats are handled.

According to the present invention, there is provided a sync stripper circuit including:

a composite sync signal stripping circuit for receiving a composite video signal with a horizontal sync frequency within one of first, second, third and fourth frequency ranges and for stripping the composite sync signal from the received composite video signal;

a horizontal sync detection circuit for detecting the horizontal sync signal from a stripped composite sync signal;

a vertical sync detection circuit for detecting the vertical sync signal from the stripped composite sync signal;

F1/F2 field detection means for detecting the F1 or F2 field from the stripped composite sync signal; and a control for controlling the horizontal sync detection circuit, the vertical sync detection circuit and the F1/F2 field detection circuit to operate in the selected one of the first, second, third or fourth frequency ranges of the received composite video signal.

According to a feature of the present invention, a serrating signal circuit inserts a horizontal signal into the vertical sync signal if serrating signals are absent therein.

DESCRIPTION OF THE PREFERRED EMBODIMENTS

Figure 1:
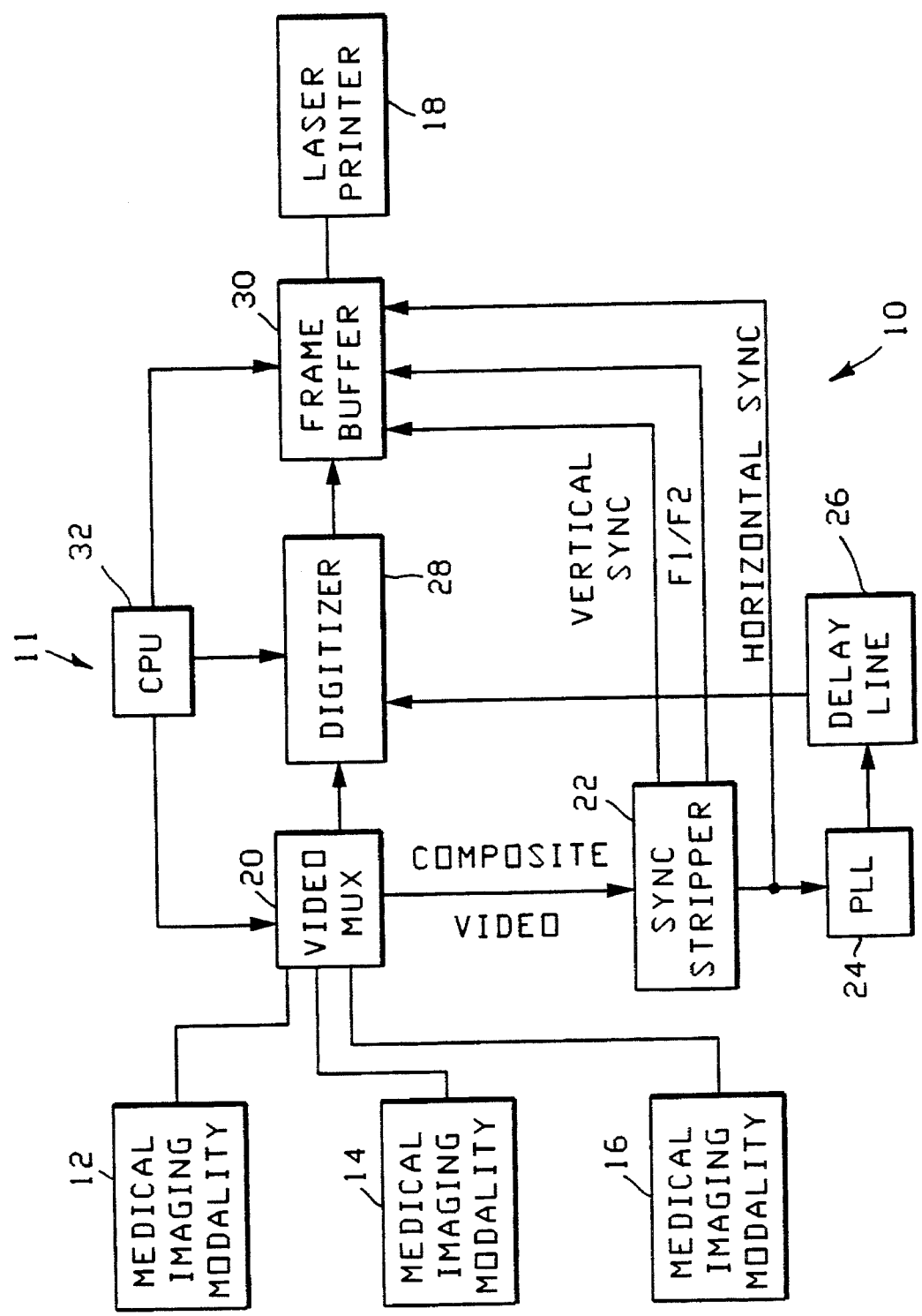
FIG. 1 is a block diagram of a medical imaging system incorporating an embodiment of the present invention.

Referring now to FIG. 1, there is shown a block diagram of a medical imaging system, including an embodiment of the present invention. As shown, medical imaging system 10 includes an image acquisition interface 11 which acquires analog video image signals (which can be of the same or of different formats) from medical imaging modalities 12, 14 and 16, converts them into digital images, and outputs them to laser printer 18, which produces a hard copy radiographic film image. Interface 11 includes a video MUX 20 for multiplexing images received from modalities 12, 14 and 16.

A sync stripper circuit 22, according to the present invention, produces horizontal sync, vertical sync and F1/F2 field designation signals from a composite video signal from MUX 20. Phase lock loop (PLL) 24 recovers horizontal sync from the composite video signal and produces a sampling signal which is delayed by delay line 26 and applied to analog-to-digital converter (digitizer) 28, which receives the active video portion of the composite video signal from video MUX 20. The vertical sync, horizontal sync and field designation (F1/F2) signals are applied to frame buffer 30, which stores the digital image from digitizer 28. Control processing unit (CPU) 32 (which may, for example, be a microprocessor) controls the operation of MUX 20, digitizer 28 and frame buffer 30. The digital signal from frame buffer 30 is outputted to laser printer 18.

Referring now to FIGS. 2-5, there is shown an embodiment of the sync stripper circuit 22 according to the present invention. Sync stripper circuit (FIG. 2) 22 includes buffer amplifier 34 (which receives the composite video signal from video MUX 20) peak detector and DC offset amplifier 36, high-speed comparator 38, vertical sync detection circuit 40, horizontal sync detection circuit 42, field (F1/F2) detection circuit 44 and control logic circuit 46, which receives control logic signals from CPU 32.

Figure 2:
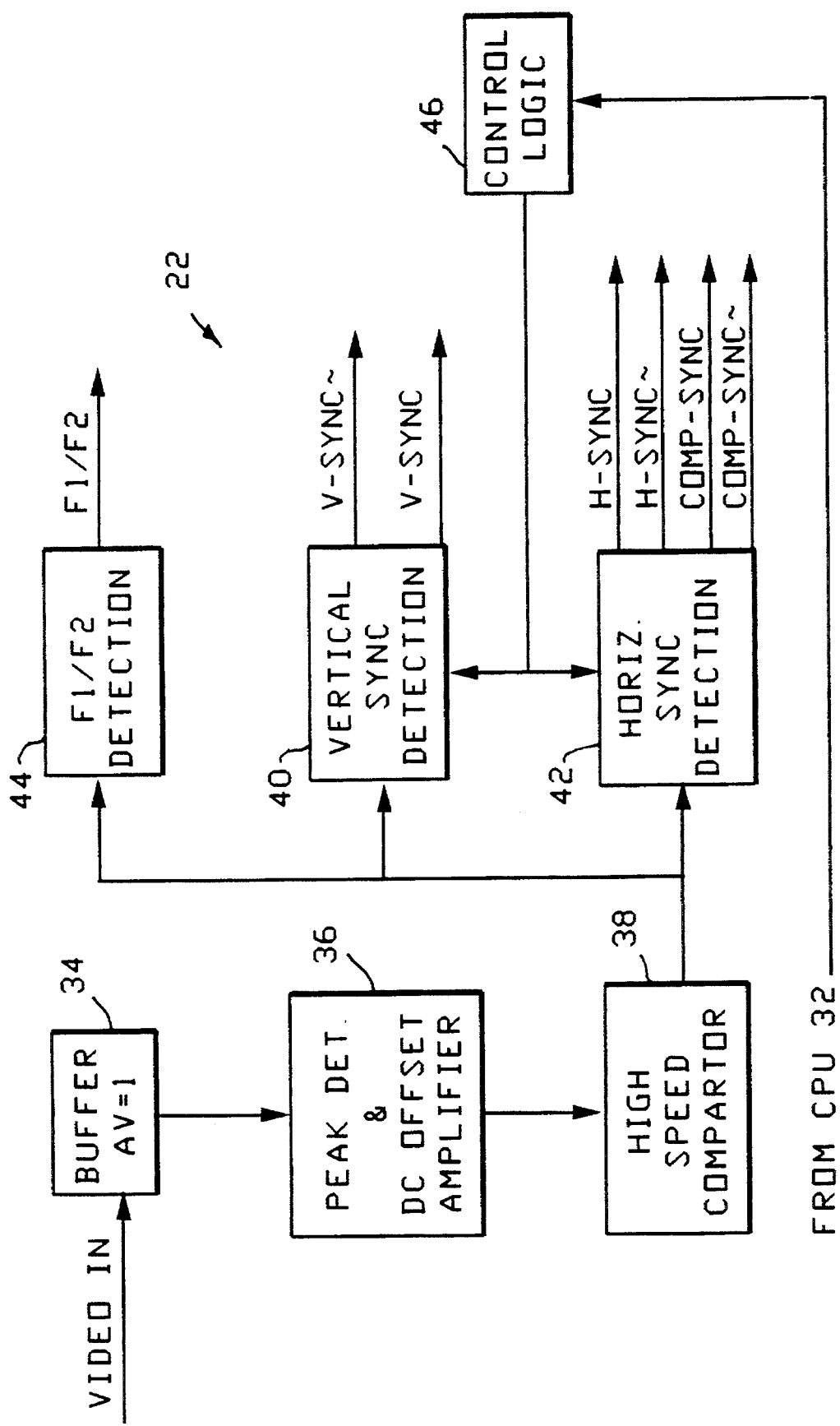
FIG. 2 is a block diagram of an embodiment of the present invention as used in FIG. 1.
Figure 3:
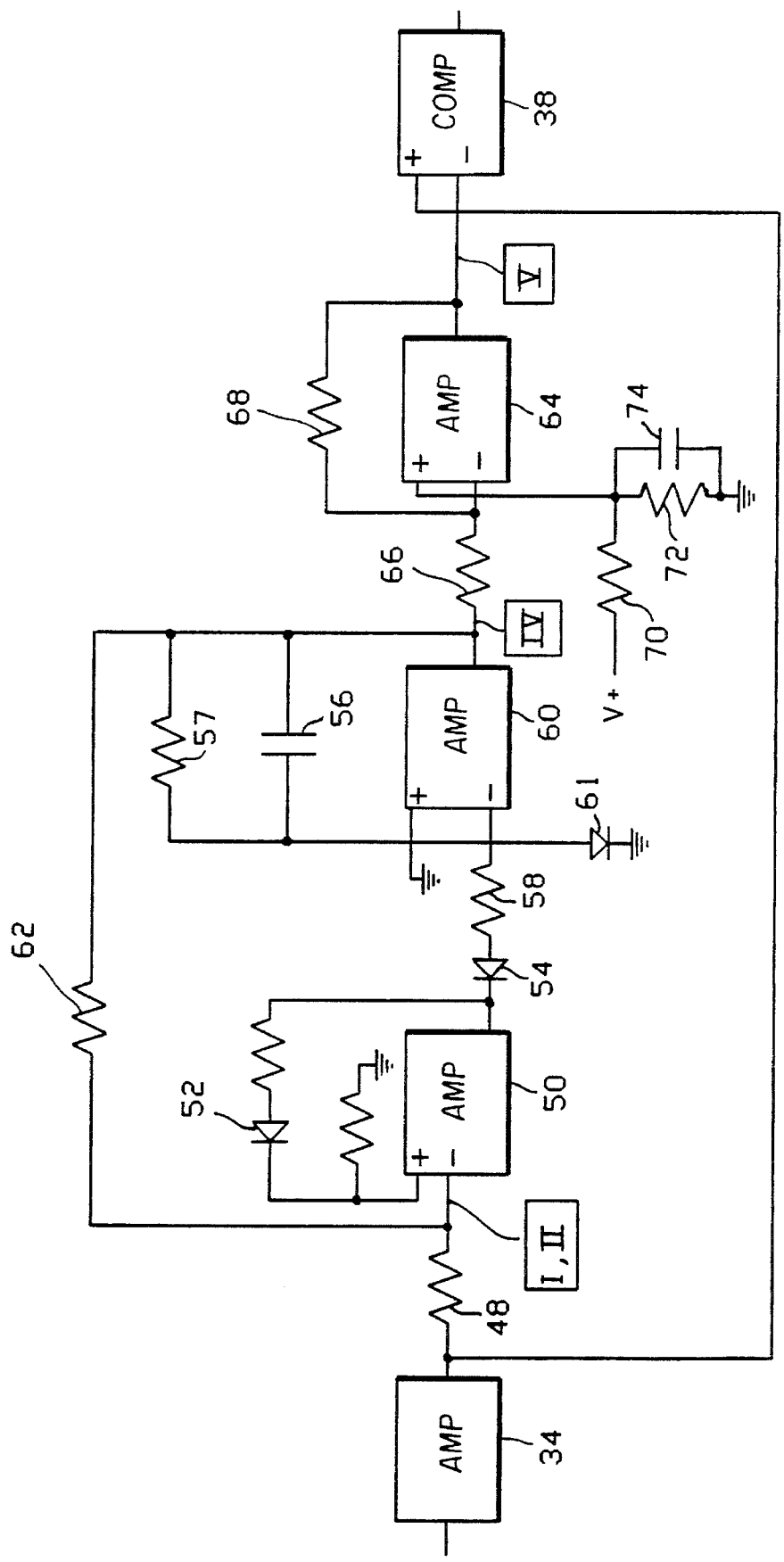
FIGS. 3, 4 and 5 are circuit diagrams of the sync stripper circuit of FIG. 2.
Figure 4:
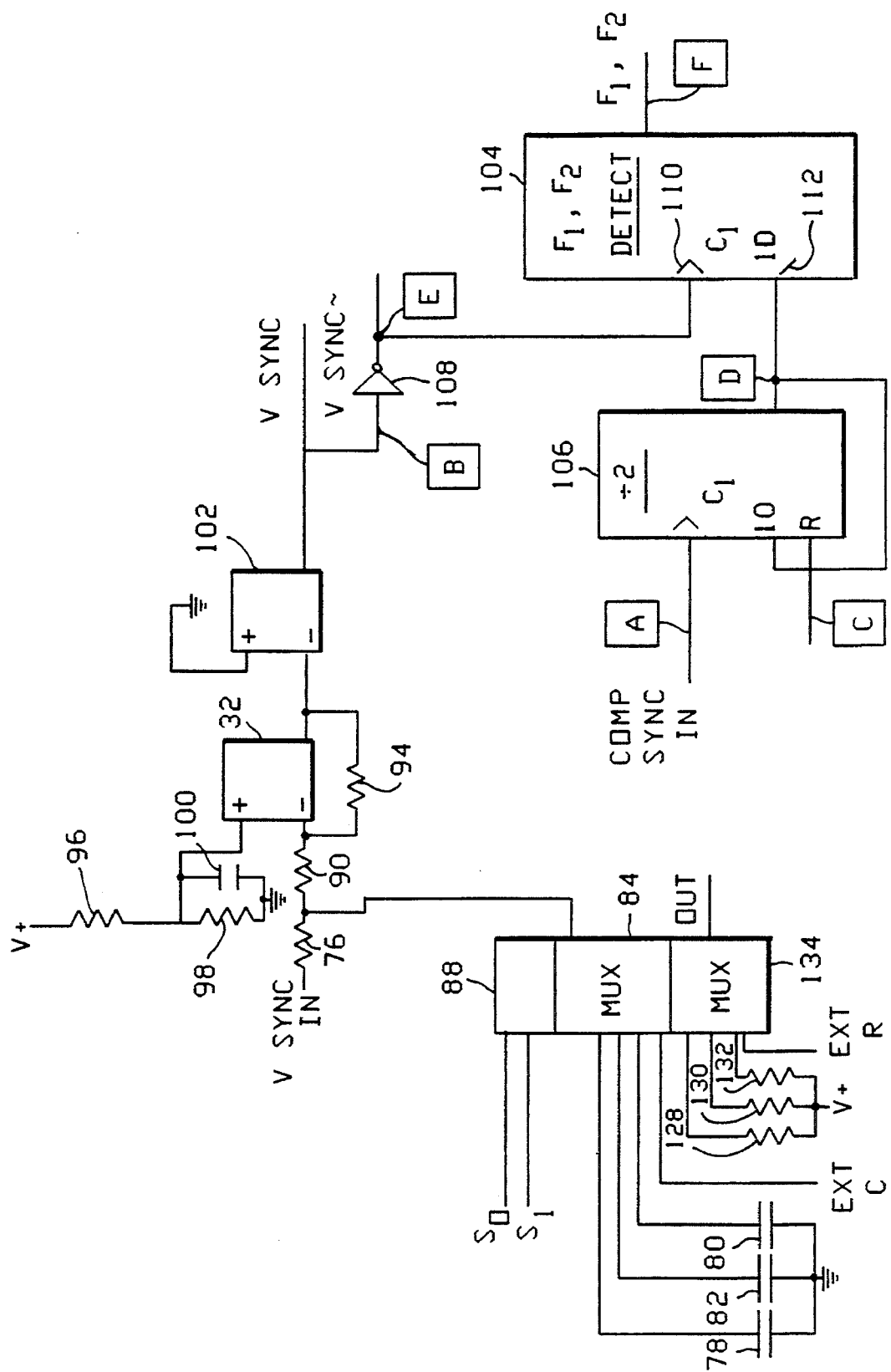
Figure 5:
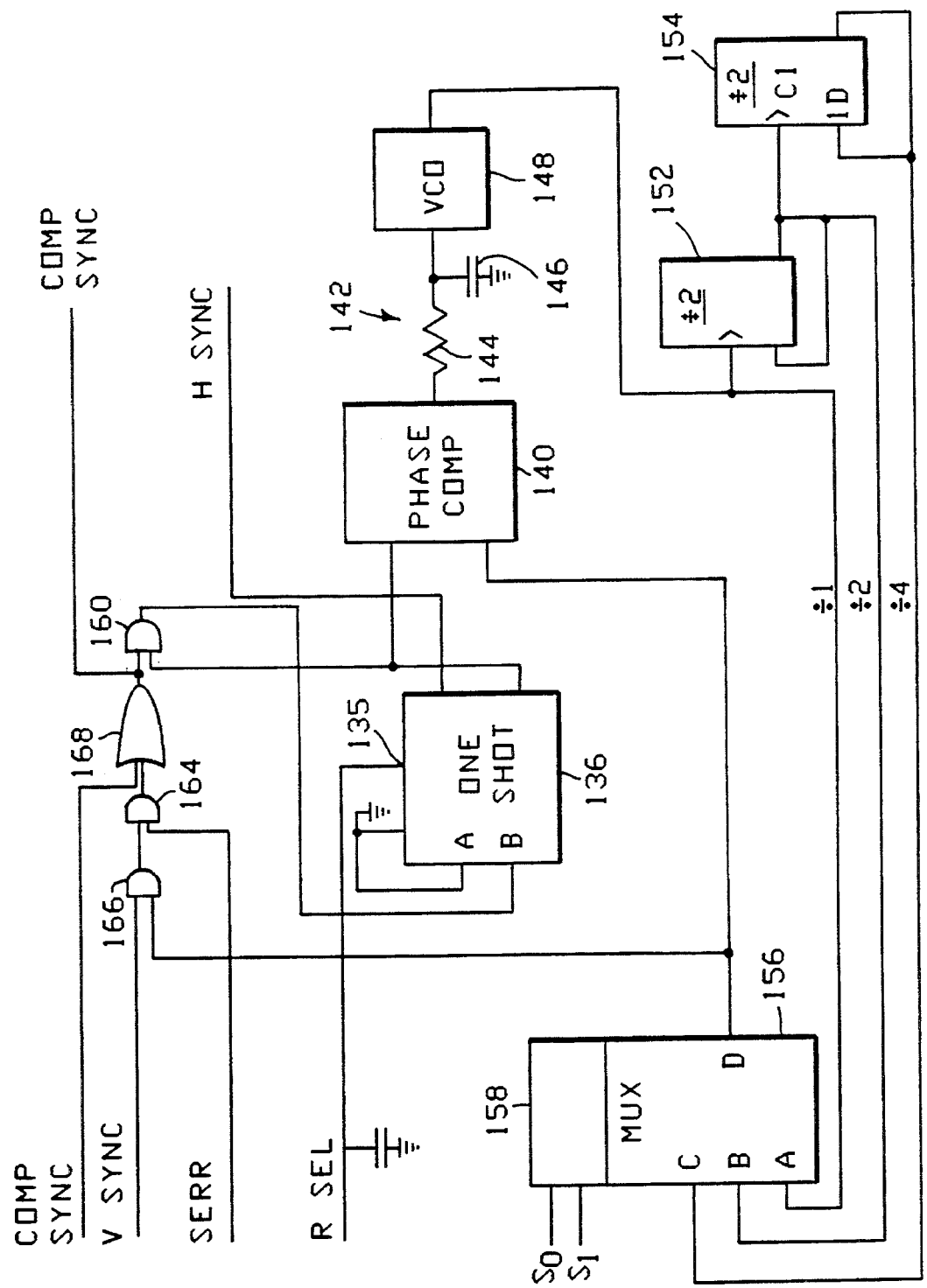

FIGS. 3, 4 and 5, show a detailed implementation of the sync stripper circuit of FIG. 2. As shown in FIG. 3, the composite video signal from video MUX 20 is applied to a wide band unity gain buffer amplifier 34. Amplifier 34 both isolates and amplifies the composite video signal.

The function of peak detector 36 is to capture the level of the sync tip. In reality, the peak detector is functioning as a sample and hold circuit. In the application provided, the dynamic range of peak detector 36 is very small (+/−450 millivolts) depending upon whether there is an all white or all black image. Peak detector 36 includes a wide band, high current drive amplifier 50 connected to amplifier 34 by resistor 48 and two high-speed recovery diodes 52 and 54. Diode 54 is connected to an integrator circuit including capacitor 56, resistors 57 and 58 and operational amplifier 60. Diode 61 is connected to the negative input of operational amplifier 60. The positive input of amplifier 60 is connected to ground. This is a precision integrator that incorporates excellent DC characteristics, including low high bias and low high offset. These DC parameters are required in order to minimize droop in the integrator circuitry.

Feedback is provided from the output of the integrator to the input of the peak detector through resistor 62. The feedback loop gives the circuit the following advantages: independence from the non-linear voltage drop across diode 54 over temperature, frequency and amplitude variations of the input signal.

The last portion of the circuit is a DC level shifter and a high-speed comparator. The output of amplifier 60 is connected to the negative input of operational amplifier 64 through resistor 66. A resistor 68 connects the output of amplifier 64 with the negative input. The positive input of amplifier 64 is connected to a voltage divider network comprising resistors 70 and 72, connected between a positive DC source and ground. Capacitor 74 is connected in parallel with resistor 72. After detection of the sync tip, the DC bias is summed in with the detected level to center the DC voltage in the middle of the image.

Figure 6:
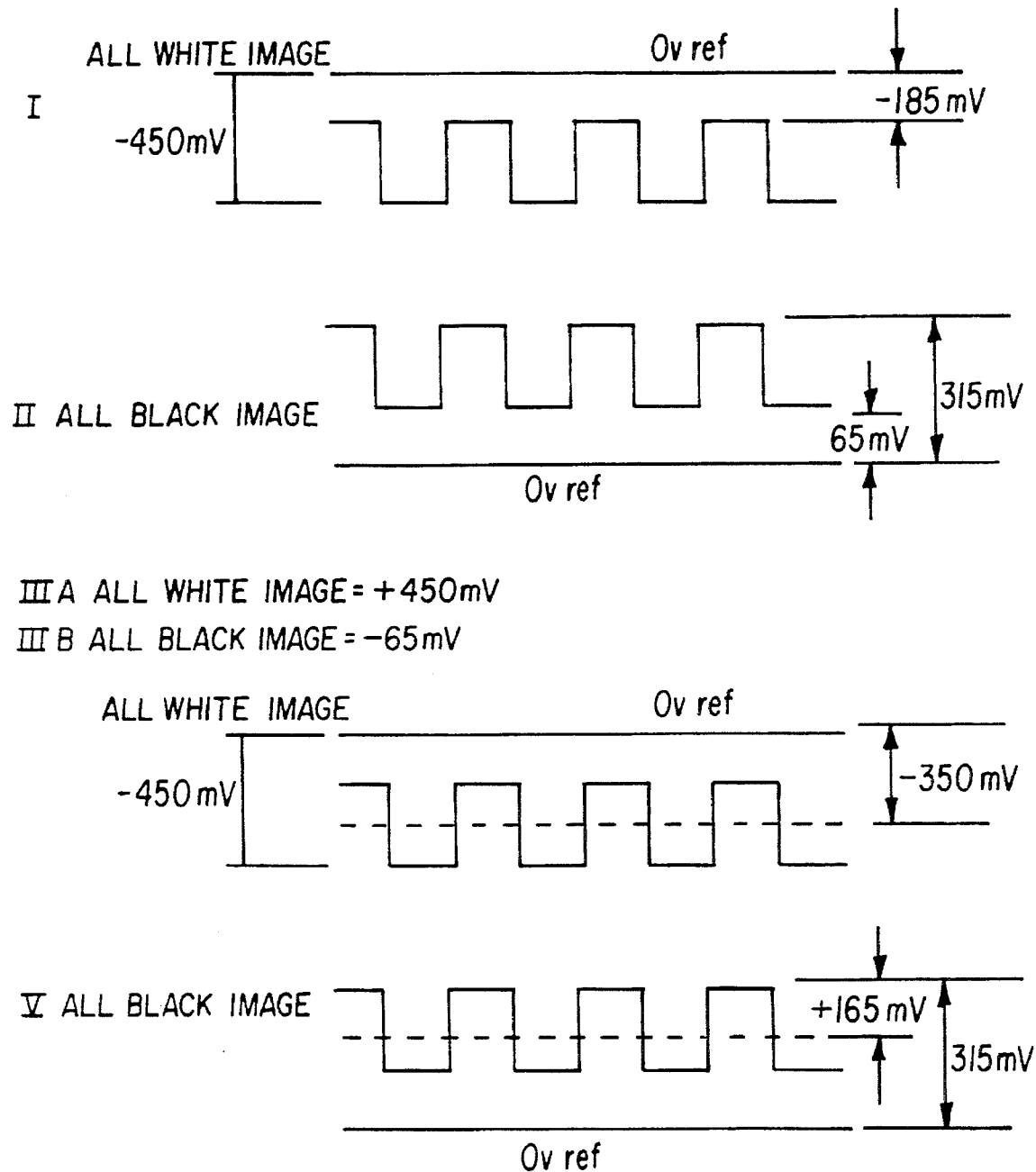
FIGS. 6 and 7 are waveform diagrams useful in describing operation of the embodiment of FIG. 2.

Referring now to FIG. 6, the operation of the circuit of FIG. 3 will be described with reference to waveforms I–V. Waveforms I and II are taken at the output of amplifier 34 and respectively depict an all white video image and an all black video image. IIIA and IIIB indicates the value of the sync tip for waveforms I, II. The waveforms IV and V, taken at the output of amplifier 64, indicate the DC level shifting produced by amplifier 64.

The output of amplifier 64 is applied to the negative input of high-speed comparator 38. This voltage becomes a negative variable reference used by the high-speed comparator 38 to reference the video input signal, which is applied from the output of amplifier 34, to the positive input of comparator 38. The high-speed comparator 38 is used to clip the video information from the composite video signal. The clamping levels are accomplished by supplying asymmetrical power to the comparator which will result in leaving standard TTL voltage output levels.

Realizing that all the timing information is contained within the composite sync of the video signal, this signal can be used to derive the following timing signals: vertical sync, F1/F2 (odd or even field) and horizontal sync. Since the horizontal and vertical sync signals are equal in amplitude, the methods of separating them from composite sync cannot be used to distinguish between them. They do, however, differ in time duration, and this difference is used as the basis for effecting derivation of vertical and horizontal sync.

Vertical sync is derived by performing integration on the composite sync signals during vertical blanking. Referring to FIG. 4, the vertical sync circuit includes a resistor 76, selectable capacitors 78, 80 and 82 connected to multiplexer 84. An external capacitor is connectable to multiplexer 84 at terminal 86. Control signals S0 and S1 are applied to control section 88 of multiplexer 84. The choice of integration time is user selectable and is based on the horizontal line frequency of the video signal format of the specific modality. In the illustrative medical imaging application, the capacitor values are selected as follows: if the horizontal sync is greater than 15.7 kHZ but less than 24 kHZ, the control signal applied to control 88 has a value 00 and capacitor 78, having a value of 3300 picofarads, is selected. If the horizontal sync signal has a value between 24.1 kHZ and 37 kHZ, the control signal applied to control 88 has a value 10 and capacitor 82, having a value of 1800 picofarads, is selected. If the horizontal sync signal has a value between 37.1 kHZ and 72 kHZ, the control signal applied to control 88 has a value 01 and capacitor 80, having a value of 470 picofarads, is selected. If the horizontal sync signal has a value higher than 72 kHZ, the control signal applied to control 88 has a value 11 and an external capacitor of appropriate value is selected.

During the pre/post equalizing time frame of the vertical sync interval, the chosen integrator capacitor accumulates charge with every pulse because there is very little voltage decay during the discharge cycle (the time of charge is much greater than the time of discharge). However, this is not the case when the serrating pulses are integrated and, in fact, no charge is stored on the chosen integrator capacitor because of a short charge time (time of charge is much less than the time of discharge).

The integrated signal is applied to a gain and DC level shifting circuit including resistor 90, operational amplifier 92, feedback resistor 94 and a voltage divider network, including resistors 96 and 98. Capacitor 100 is in parallel with resistor 98. The output of amplifier 92 is applied to the negative input of zero crossing detector amplifier 102, whose positive input is connected to ground. The output of amplifier 102 is vertical sync.

Odd and even field detection, i.e. F1/F2 detection, is accomplished by using a single input D flip-flop 104 and is clocked by the following signals: composite sync signal, vertical sync signal and modified vertical sync signal. Because F1/F2 differ in time by half of a horizontal line, both signals must be synchronized. Synchronization is accomplished by dividing the composite sync by two by means of divider 106. The V sync signal outputted from amplifier 102 is inverted by invert amplifier 108 and applied to the clock input 110 of D flip-flop 104. The divided-by-two composite sync signal is applied to the D input 112 of D flip-flop 104. The output of D flip-flop 104 is a positive or negative signal, indicating detection of the F1 or F2 field.

Figure 7:
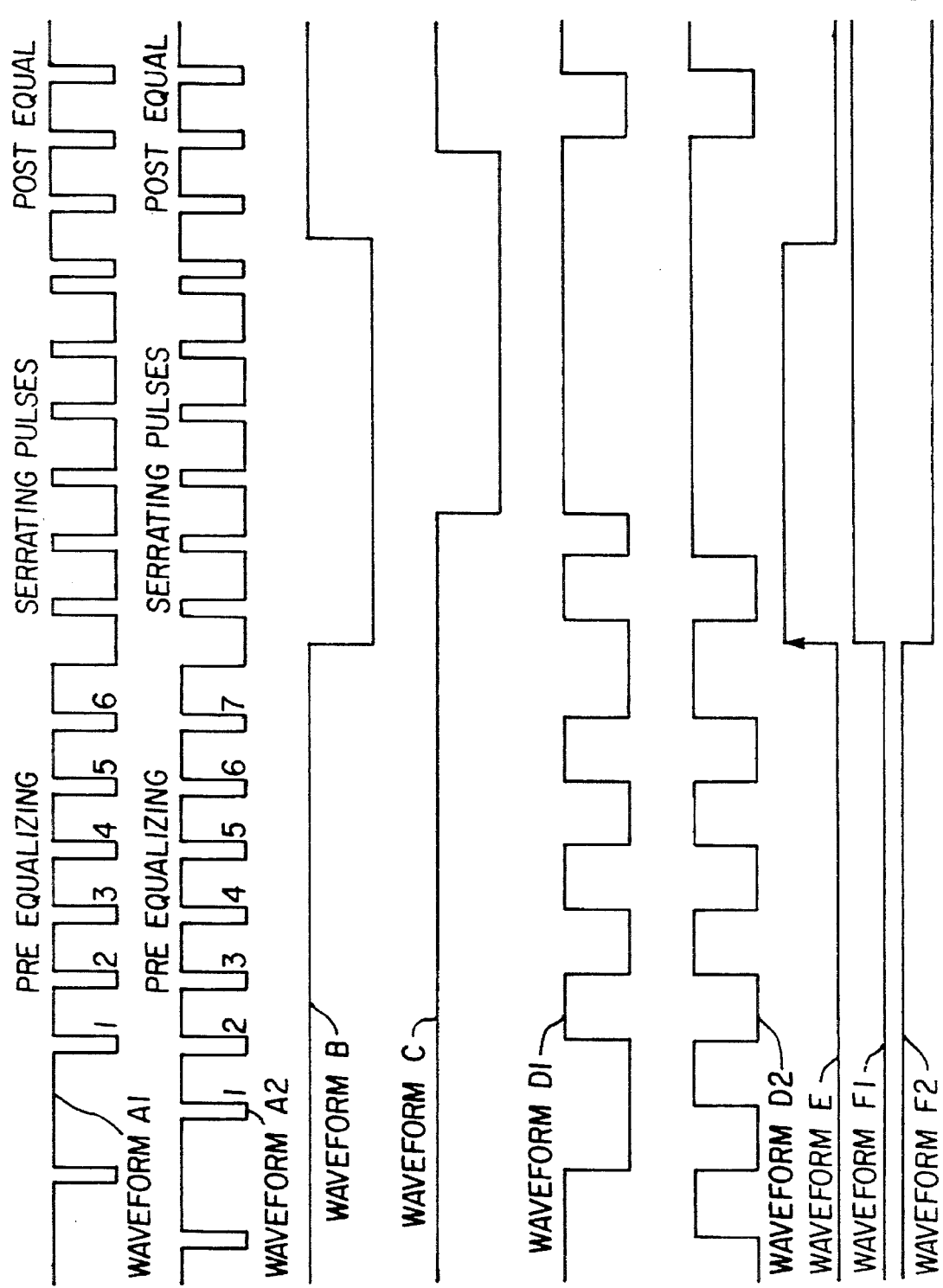

Referring to FIG. 7, several waveforms are shown which are useful in illustrating the operation of the F1/F2 detection circuit. Waveforms A1 and A2, at the input of divider 106, are composite sync signals of the F1 field and the F2 field, respectively, and include pre-equalizing, serrating and post-equalizing signals. Waveform B is the vertical sync signal at the output of amplifier 102, and waveform E is the inverted sync signal at the output of invert amplifier 108. Waveforms D1 and D2 are, respectively, the divided-by-two composite sync signals at the output of divider circuit 106 for the F1 and F2 fields. Waveforms F2 and F1 are the outputs of D flip-flop 104, respectively, for fields F2 and F1. Waveform C is a modified V sync signal applied to reset divider 106.

Horizontal sync information is contained within the composite sync signal and thus must be decoded. The horizontal sync circuitry of the present invention is comprised by a modified phase-lock loop circuit that performs both horizontal sync detection and compensation for the absence of serrating pulses during the vertical sync signal from medical imaging modalities that do not produce serrating pulses. Referring to FIGS. 4 and 5, the horizontal sync circuit includes a selectable resistor which is selected from resistors 128, 130, 132 or an external resistor by means of multiplexer 134 controlled by control signals 50, 51 applied to control 88. The output of multiplexer 134 is applied to input 135 of one-shot multivibrator 136. The selected resistor 128, 130, 132, external R is combined with capacitor 138 to establish the time constant for the output of one-shot multivibrator 136.

The modified phase-lock loop circuit includes phase comparator 140, low-pass filter 142 including resistor 144 and capacitor 146, voltage controlled oscillator (VCO) 148, divider circuit 150 including flip-flops 152 and 154, and MUX 156. MUX 156 is controlled by input signals S0 and S1 to control 158 of MUX 156.

In operation, controls signals S0 and S1 are applied to control 88 of MUX 134 and control 158 of MUX 156 to select the appropriate resistor and divisor according to the following table:

TABLE

| Frequency | S0 | S1 | V-sync | H-sync | DIV | VCO Freq |
|---|---|---|---|---|---|---|
| 15.7k < H-sync < 24kHZ | 0 | 0 | C-78 | R-128 | 4 | 63–93kHZ |
| 24.1k < H-sync < 37kHZ | 1 | 0 | C-82 | R-130 | 2 | 48–74kHZ |
| 37.1k < H-sync < 72kHZ | 0 | 1 | C-80 | R-132 | 1 | 37–72kHZ |
| ext. selectable | 1 | 1 | EXT-C | EXT-R | 1 | >93kHZ |

| | |
|---|---|
| serrating signals present | serr = 0 |
| serrating signals absent | serr = 1 |

The composite sync signal is applied through AND gate 160 to the input of one-shot multivibrator 136. The output of one-shot multivibrator 136 is applied to phase comparator 140, the output of which is filtered by low-pass filter 142. The voltage developed across capacitor 146 is applied to VCO 148. The output of VCO 148 is applied directly to input terminal A of multiplexer 156. The output is also applied to divide-by-two divider 152, whose output is applied to input terminal B of multiplexer 156. The output of multivibrator 152 is also applied to the input of divide-by-two divider 154, whose output is applied to input terminal C of multiplexer 156. The output of multiplexer 156 at output terminal D is applied to the other input of phase comparator 140.

If there are no serrating signals in the vertical sync interval of the video signal received from a medical imaging modality, the serrating signal "absence" signal "1" is asserted on control line 162 and applied as an input to AND gate 164. The other input of AND gate 164 is connected to the output of AND gate 166, whose inputs receive the inverted vertical sync signal (waveform D of FIG. 7) and the output of multiplexer 156. When there are no serrating signals, the horizontal sync signals produced by the horizontal sync PLL circuit are inserted into the vertical sync period determined by the waveform E applied to AND circuit 166. Glue logic is used to gate and sum the serrating signals into the composite sync signal. This circuit is used as a trigger enable for one-shot 136, which masks out H sync from composite sync.

Because a phase-lock loop circuit is being used, all of the timing phase relationships will be locked to the video signal. As seen in the Table, the VCO frequency range is kept small for better linearity. This insertion of serrating signals into the composite video assures that the main phase-lock loop will remain locked during V sync. When the serrating signal "present" signal 0 is asserted on control line 162, AND gate 164 is low and the composite sync signal applied to OR gate 168 is used as the output composite sync signal.

Technical Affect

The sync stripper circuit of the present invention is useful in medical imaging systems in which different format video signals from different medical imaging modalities are digitized for use by a hard copy output device (laser printer, multiformat camera), by a display device, or by an image storage device (magnetic, optical).

Although the invention has been described with reference to preferred embodiments thereof, it will be understood that variations and modifications can be effected within the spirit and scope of the invention as described above and as defined in the appended claims.

What is claimed is:

1. A sync stripper circuit comprising:

composite sync signal stripping means for receiving a composite video signal with a horizontal sync frequency within one of first, second, third, and fourth frequency ranges, and for stripping the composite sync signal from said received composite video signal;

horizontal sync detection means for detecting the horizontal sync signal from said stripped composite sync signal;

vertical sync detection means for detecting the vertical sync signal from said stripped composite sync signal;

F1/F2 field detection means for detecting the F1 or F2 field from said stripped composite sync signal; and control means for controlling said horizontal sync detection means, said vertical sync detection means and said F1/F2 field detection means to operate in the selected one of said first, second, third and fourth frequency ranges of said received composite video signal.

2. The sync stripper circuit of claim 1 wherein said composite sync signal stripping means includes:

peak detector means for detecting the peak sync value of said received signal,

DC level shifting means for shifting the DC level of said detected peak signal value; and high speed comparator means connected to said DC level shifting means for stripping out said composite sync signal from said composite video signal.

3. The sync stripper circuit of claim 1 wherein said horizontal sync detection means includes a selectable horizontal sync parameter which is a function of the frequency range within which said horizontal sync frequency of said received signal is and wherein said control means controls said horizontal sync detection means to select said horizontal sync parameter as a function of said first, second, third or fourth frequency ranges.

4. The sync stripper circuit of claim 3 wherein said vertical sync detection means includes a selectable vertical sync parameter which is a function of the frequency range within which said horizontal sync frequency of said received signal is, and wherein said control means controls said vertical sync detection means to select said vertical sync parameter as a function of said first, second, third or fourth frequency ranges.

5. The sync stripper circuit of claim 1 wherein said horizontal sync detection means includes a phase lock loop for detecting said horizontal sync of said received signal; wherein said received signal can have a vertical sync signal absent serrating signals; and wherein said control means includes logic means, which, upon receipt of a serrating signal absence control signal, inserts horizontal sync signals from said phase lock loop into said vertical sync signal to replace said absent serrating signals.

* * * * *